Patented Oct. 30, 1945

2,388,218

UNITED STATES PATENT OFFICE 2,388,218

MANUFACTURE OF NITRILES

John F. Olin, Grosse Ile, Mich., assignor to Sharples Chemicals Inc., Philadelphia, Pa., a corporation of Delaware No Drawing. Application December 29, 1943, Serial No. 516,091

7 Claims. (Cl. 260—464)

The present invention relates to the preparation of nitriles from amines. The general reaction by which this is accomplished may be represented by the following equation:

1. 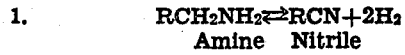
   Amine    Nitrile in which the symbol R represents any aliphatic, cyclo-aliphatic, aromatic or heterocyclic radical. The nitrile formed by the reaction of the above equation may be decomposed to form olefins and other products of degradation, or olefins or other undesired products may be formed by decomposition of the amine itself. On the other hand, the amine to be dehydrogenated to form the desired nitrile may be condensed with itself instead of being dehydrogenated, such condensation being represented by the following equations:

2. 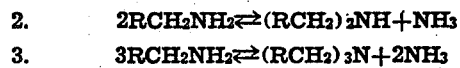
3. $3RCH_2NH_2 \rightleftarrows (RCH_2)_3N + 2NH_3$

From consideration of Equations 1, 2 and 3, above, and of the possibility of degradation of the formed nitrile or amine, it will be realized that the conversion and yield obtainable in manufacture of a nitrile by a dehydrogenation process such as illustrated by Equation 1 are limited by a number of factors. The temperatures at which this dehydrogenation reaction is accomplished ordinarily vary between 150 and 500° C., and temperatures within this entire range may be used in practice of the present invention, the particular temperature chosen depending somewhat upon the catalyst used and also depending upon the particular amine to be dehydrogenated, as in the prior art. In practice of the prior art, however, the temperature chosen to promote the desired reaction of Equation 1 was somewhat limited because of the desirability of minimizing degradation of the formed nitrile. If a temperature was adopted which was very high, loss was high, due to decomposition. If, on the other hand, the temperature was relatively low, an equilibrium was established under conditions involving an inadequate conversion of the amine to the desired nitrile. There was no way of increasing the ratio of nitrile to amine in the resultant mixture without at the same time causing degradation to form olefins and other undesired products.

The present invention provides a process by which the reaction of Equation 1 can be pushed much further to the right than could be accomplished by practice of the prior art. This invention involves maintenance of a hydrogen acceptor in the reaction mixture during the course of the reaction of Equation 1. This hydrogen acceptor may be any organic compound to which hydrogen may readily be added, and the only limitation imposed upon choice of such compounds for use in the practice of the invention is that they should not be compounds which react with the amine or the formed nitrile to form undesired by-products. The preferred class of hydrogen acceptor for use in the practice of the invention is that of compounds having olefinic double bonds such as the open chain and cyclo-aliphatic olefins (excluding, however, conjugated diolefins), and other compounds having olefinic double bonds in substituent radicals. Another class of compounds excellently adapted for practice of the invention is that of the aromatic hydrocarbons, benzene and toluene being preferred. Compounds of relatively low molecular weight such as ethylene, propylene, butylene, amylene and benzene are preferred as hydrogen acceptors, because of the fact that use of compounds of low molecular weight provides more hydrogen acceptance per gram of diluent than would be realized with compounds of higher molecular weight.

The invention may be practiced either in vapor phase or in liquid phase. In converting an amine to a nitrile by vapor phase operation, the amine is passed, together with the hydrogen acceptor, which may be any olefin or other compound capable of forming addition compounds with hydrogen formed by dehydrogenation of the amine, through a conduit preferably containing a catalyst of hydrogenation and dehydrogenation, at a temperature between 150 and 500° C. (usually between 200 and 350° C.), depending upon the catalyst and other conditions. The hydrogen liberated from the amine reacts with the hydrogen acceptor, with the result that the reaction proceeds much further to the right than could otherwise be accomplished. It should be noted that the action of the hydrogen acceptor in promoting the reaction of Equation 1 to the right, by favoring this reaction, enables the operator to accomplish the degree of conversion to the nitrile desired at a lower temperature than this could otherwise be accomplished. As a consequence of this fact, decomposition of the formed nitrile is reduced as compared to prior art operation, by use of the hydrogen acceptor. Similarly, by favoring progress of the reaction of Equation 1 to the right, this reaction is promoted at the expense of the reactions of Equations 2 and 3, with the result that the ratio of nitrile to poly-alkyl amines is higher than in the practice of the prior art.

Thus, by the use of the hydrogen acceptor, the yield of the desired nitrile, as compared to conversion of the amine to undesired products, is materially enhanced. The fact that the hydrogen acceptor fulfills its intended function in accordance with the above-discussed theory is further demonstrated by the fact that substantial hydrogenation of this hydrogen acceptor occurs in practice of the invention, as indicated by analysis of this diluent before and after the reaction.

The reaction is not necessarily conducted in vapor phase, as discussed above, and indeed, for the relatively non-volatile amines, it is best to conduct the process of dehydrogenation to form the nitrile in the liquid phase. It is also possible to conduct the reaction of the invention in batch operation, as well as continuously.

In practice of the invention, the amine to be dehydrogenated may be mixed with ammonia as well as with the hydrogen acceptor, as the presence of ammonia in the reaction mixture serves to depress formation of poly-alkyl amines, and thus to favor practice of the reaction of Equation 1 at the expense of Equations 2 and 3. As a further possibility, the reaction mixture may be diluted with inert diluents such as nitrogen.

In the practice of the invention continuously or in batch, whether in vapor phase or liquid, it is not essential that the starting materials be the amine and the hydrogen acceptor. The amine may be formed in the course of the reaction, by using as initial reactants a primary alcohol or ether and ammonia, in which case, the amine formed by condensation of the alkylating agent with ammonia will be dehydrogenated in the presence of the catalyst and hydrogen acceptor to form the desired nitrile. Similarly, an aldehyde may be passed together with ammonia and the hydrogen acceptor into contact with a hydrogenating and dehydrogenating catalyst to form a nitrile.

The catalyst used to promote the reaction may be any dehydrogenating and hydrogenating catalyst which can be used to convert an amine into nitrile, the preferred catalysts being metals, metal oxides or salts selected from the group consisting of nickel, iron, cobalt, copper, oxides and sulfides of chromium, manganese, zinc, molybdenum, and tungsten, and active salt-types formed by ignition and reduction of copper, cadmium, zinc and silver chromates, vanadates and molybdates; e. g., copper chromite. These complex types may be stabilized by the incorporation of small quantities of barium or calcium salts. In cases in which aromatic hydrocarbons are used as the hydrogen acceptors in practice of the invention, it is best that relatively powerful catalysts, such as nickel or cobalt, be used. In cases in which a nitrile is to be formed from an aromatic substituted amine such as benzyl amine, on the other hand, it is best that catalysts other than nickel and cobalt be used, as these powerful catalysts have an undesirable tendency to cause hydrogenation of the benenze ring of aromatic-substituted amines and nitriles. As noted above, the temperature to be employed will depend upon the particular catalyst and the particular amine. In cases in which ethyl amine is to be converted into acetonitrile in the presence of a nickel catalyst with amylene as the hydrogen acceptor, temperatures between 200° C. and 250° C. have given excellent results, although a considerably wider range of temperatures may be employed, even with this specific catalyst, amine and hydrogen acceptor.

While the invention may be practiced under a variety of pressure conditions ranging from subatmospheric to high super-atmospheric pressures, best results are attained under substantial superatmospheric pressures.

While the most specific object of the invention consists in improvement of the yield and conversion in manufacture of nitriles from amines, a large quantity of poly-alkyl amines is usually formed. This is not necessarily an undesirable feature, since these amines have considerable value as a rule, their value depending, of course, upon the particular state of supply and demand of such amines at a given time. By the use or non-use of ammonia together with the hydrogen acceptor in dehydrogenation of the amine in practice of the invention, the ratio of poly-alkyl amine formed by reactions of Equations 2 and 3 to the nitrile formed by Equation 1 may be controllably varied to a substantial extent, with the result that the process may be adjusted to favor production of the compound most in demand at a particular time.

The following examples illustrate the practice of the invention:

*Example I*

When the reaction is carried out by batch procedure it is best to employ a stirring autoclave or a bomb which is rocked or rotated so as to disperse the catalyst. The following is an example of such a procedure:

730 grams of monobutylamine, 1500 grams of pentene-2, and 100 grams of cobalt catalyst (prepared by reducing basic cobalt carbonate at 325° C. by means of a stream of hydrogen) are charged into a two gallon, stirring-type autoclave. After securing the lid of the autoclave, 340 grams of liquid ammonia are introduced by means of a bomb. Stirring is then commenced and the reaction mass heated for twelve hours at a temperature of 180–200° C., during which time an internal pressure of from 1200 to 1500 lbs./sq. in. is developed. After cooling, the autoclave is discharged and the ammonia allowed to evaporate. Thereupon the finely divided catalyst is separated by filtration and may be reserved for re-use. The filtrate may then be separated by means of fractional distillation. Besides containing some ammonia, the first cut is essentially pentane containing small quantities of pentene-2. After removing immediate cuts, the temperature rises rapidly to about 115° C. The cut boiling from 115–120° C. is butyronitrile of good purity. The yield is in excess of 70%. The residue remaining in the distillation flask consists chiefly of dibutylamine and small quantities of tributylamine, and unidentified neutral substances.

*Example II*

When the reaction is conducted in the continuous manner, a suitable apparatus consists of proportioning pumps leading to a preheater connected with a reactor. Following the reactor, there is a condenser and suitably a pressure still with a column and condenser to provide reflux. The latter permits the removal of ammonia and hydrocarbon gases without allowing the volatile nitrile and other valuable products to be swept from the system.

Monoethylamine, ammonia and propylene in a molecular ratio of one to six to three is proportioned into the preheater at a space velocity of 600 and a pressures of 4500 lbs./sq. in. It then passes through the reactor containing pelleted nickel on silica gel. The latter is maintained at a temperature of about 220° C. The volatile materials are distilled under pressure and after scrubbing with water to remove ammonia, may be condensed. They now consist chiefly of propane containing some propylene. The bottoms left in the pressure still are removed and worked up at atmospheric pressure. After removing a constant boiling mixture consisting of approximately 93% diethylamine and 7% acetonitrile, which boils at about 53° C., the temperature rises rapidly to 81° C., when almost pure acetonitrile containing only traces of triethylamine is taken off. The conversion of monoethylamine to acetonitrile by the above procedure is about 60%. When the presence of small quantities of amines in the acetonitrile is undesired they may be removed by acidification or absorption with acidic substances, usually followed by distillation.

*Example III*

Crude amine mixtures may be converted to nitriles in good yield, particularly if an excess of ammonia is present. When normal propyl ether is passed over an alumina-nickel oxide catalyst (as in Goshorn application, Serial No. 437,355, filed April 2, 1942) with an excess of ammonia, mono- and di-propylamines are formed. These products may, without purification, be converted to propionitrile by treatment with an olefin and nickel catalyst as in Example II.

*Example IV*

Pelleted, amorphous chromium oxide catalyst is placed in the reactor of the vapor phase reaction system of Example II. A mixture in the ratio of one mole of benzyl amine, 4 moles of ammonia and 3 moles of isobutylene is passed over this catalyst at a temperature of 400° C., a pressure of 3000 lbs./sq. in., and a space velocity of about 500. Upon working up the product, benzonitrile is obtained in excellent yield. It is noteworthy that with this mild catalyst that while isobutylene is converted to isobutane, hydrogenation of the benzene ring of benzonitrile does not occur to an appreciable extent.

*Example V*

When one part of isobutylamine, five parts of ammonia, and one part of benzene are passed over the nickel catalyst as in Example II, but preferably at a temperature of about 250° C., a good yield of isobutyrolnitrile is obtained. Simultaneously the hydrogen-acceptor, benzene, is reduced to cyclohexane.

Various modifications are possible within the scope of the invention, and I do not therefore wish to be limited except by the scope of the following claims.

I claim:

1. In the manufacture of nitriles by dehydrogenation of amines, the process comprising mixing the amine to be dehydrogenated with a hydrogen acceptor chosen from the class consisting of non-conjugated olefins and aromatic hydrocarbons, and effecting the desired dehydrogenation reaction by contacting the resulting mixture with a hydrogenating and dehydrogenating catalyst.

2. In the manufacture of nitriles by dehydrogenation of amines, the process comprising mixing the amine to be dehydrogenated with a hydrogen acceptor chosen from the class consisting of non-conjugated olefins and aromatic hydrocarbons, and effecting the desired dehydrogenation reaction by contacting the resulting mixture with a hydrogenating and dehydrogenating catalyst at a temperature between 150 and 500° C.

3. In the manufacture of nitriles by dehydrogenation of amines, the process comprising mixing the amine to be dehydrogenated with a hydrogen acceptor chosen from the class consisting of non-conjugated olefins and aromatic hydrocarbons, and effecting the desired dehydrogenation reaction by contacting the resulting mixture with a hydrogenating and dehydrogenating catalyst by passing said mixture over a hydrogenating and dehydrogenating catalyst at a temperature between 150 and 500° C.

4. In the manufacture of nitriles by dehydrogenation of amines, the process comprising mixing the amine to be dehydrogenated with a hydrogen acceptor chosen from the class consisting of non-conjugated olefins and aromatic hydrocarbons, and effecting the desired dehydrogenation reaction by contacting the resulting mixture with a hydrogenating and dehydrogenating catalyst chosen from the class consisting of nickel, iron, cobalt, copper, oxides and sulfides of chromium, manganese, zinc, molybdenum and tungsten, and copper chromite.

5. In the manufacture of nitriles by dehydrogenation of amines, the process comprising mixing the amine to be dehydrogenated with a hydrocarbon having an olefinic double bond, and effecting the desired dehydrogenation reaction by contacting the resulting mixture with a hydrogenating and dehydrogenating catalyst.

6. In the manufacture of nitriles by dehydrogenation of amines, the process comprising mixing the amine to be dehydrogenated with an aromatic hydrocarbon, and effecting the desired dehydrogenation reaction by contacting the resulting mixture with a hydrogenating and dehydrogenating catalyst.

7. A process as defined in claim 1, in which the amine is mixed with the hydrogen acceptor by condensing ammonia with a compound chosen from the class consisting of primary alcohols and aldehydes in the presence of the hydrogen acceptor to form the amine and mix it with the hydrogen acceptor, and the amine is thereafter dehydrogenated in the presence of the hydrogen acceptor.

JOHN F. OLIN.